(12) United States Patent
Kim et al.

(10) Patent No.: US 11,404,693 B2
(45) Date of Patent: *Aug. 2, 2022

(54) CATHODE ADDITIVE, PREPARATION METHOD THEREOF, AND CATHODE AND LITHIUM SECONDARY BATTERY COMPRISING THE SAME

(71) Applicant: LG Chem, Ltd., Seoul (KR)

(72) Inventors: Ji Hye Kim, Daejeon (KR); Byungchun Park, Daejeon (KR); Jungmin Han, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 88 days.

This patent is subject to a terminal disclaimer.

(21) Appl. No.: 16/756,950

(22) PCT Filed: Nov. 27, 2018

(86) PCT No.: PCT/KR2018/014723
§ 371 (c)(1),
(2) Date: Apr. 17, 2020

(87) PCT Pub. No.: WO2019/103574
PCT Pub. Date: May 31, 2019

(65) Prior Publication Data
US 2021/0083290 A1    Mar. 18, 2021

(30) Foreign Application Priority Data

Nov. 27, 2017 (KR) .......... 10-2017-0159732
Nov. 20, 2018 (KR) .......... 10-2018-0143832

(51) Int. Cl.
*H01B 1/08* (2006.01)
*H01M 4/505* (2010.01)
(Continued)

(52) U.S. Cl.
CPC .............. *H01M 4/62* (2013.01); *C01D 15/02* (2013.01); *C01G 53/42* (2013.01); *H01B 1/08* (2013.01);
(Continued)

(58) Field of Classification Search
CPC .. H01B 1/00; H01B 1/08; H01B 1/20; H01M 4/131; H01M 4/505; H01M 4/525; H01M 4/666
See application file for complete search history.

(56) References Cited

U.S. PATENT DOCUMENTS 5,393,622 A * 2/1995 Nitta ............... C01G 53/42
                                                   429/223
5,817,436 A   10/1998 Nishijima et al.
(Continued)

FOREIGN PATENT DOCUMENTS

EP    0794155 A1    9/1997
JP    H09241027 A   9/1997
(Continued)

OTHER PUBLICATIONS

English language translation of PCT/ISA/237 (mailed Apr. 2019).*
(Continued)

*Primary Examiner* — Mark Kopec
(74) *Attorney, Agent, or Firm* — Lerner, David, Littenberg, Krumholz & Mentlik, LLP

(57) ABSTRACT

The present disclosure relates to a cathode additive, a method for preparing the same, and a cathode and a lithium secondary battery including the same. More specifically, one embodiment of the present disclosure provides a cathode additive that can offset an irreversible capacity imbalance, and increase the initial charge capacity of a cathode.

11 Claims, 2 Drawing Sheets

(51) Int. Cl.
   *H01M 4/62*      (2006.01)
   *C01D 15/02*     (2006.01)
   *C01G 53/00*     (2006.01)
   *H01M 4/525*     (2010.01)
   *H01M 10/0525*   (2010.01)
   *H01M 4/02*      (2006.01)

(52) U.S. Cl.
   CPC ........... *H01M 4/505* (2013.01); *H01M 4/525* (2013.01); *H01M 10/0525* (2013.01); *C01P 2002/70* (2013.01); *H01M 2004/028* (2013.01)

(56)             References Cited

U.S. PATENT DOCUMENTS

| | | | |
|---|---|---|---|
| 5,955,219 | A * | 9/1999 | Nishijima ............... C01G 53/42 |
| | | | 429/220 |
| 6,875,416 | B1 * | 4/2005 | Benz ...................... C01G 53/44 |
| | | | 423/594.15 |
| 2003/0078443 | A1 | 4/2003 | Lee et al. |
| 2012/0003541 | A1 | 1/2012 | Song et al. |
| 2014/0147727 | A1 | 5/2014 | Park et al. |
| 2015/0340692 | A1 | 11/2015 | Park et al. |
| 2020/0266447 | A1 * | 8/2020 | Kim ...................... H01M 4/505 |
| 2021/0083290 | A1 * | 3/2021 | Kim ...................... H01M 4/131 |

FOREIGN PATENT DOCUMENTS

| | | |
|---|---|---|
| JP | 2005187326 A | 7/2005 |
| JP | 2010170741 A | 8/2010 |
| JP | 2011129258 A | 6/2011 |
| KR | 100432152 B1 | 5/2004 |
| KR | 20060008568 A | 1/2006 |
| KR | 101397022 B1 | 5/2014 |
| KR | 101444510 B1 | 9/2014 |
| KR | 20150028206 A | 3/2015 |
| KR | 101772737 B1 | 9/2017 |

OTHER PUBLICATIONS

Extended European Search Report with Written Opinion for Application No. 18881948.6 dated Nov. 13, 2020, 8 pages.
Imanishi N et al: "Preparation and electrochemical properties of a Li2CuO2-solid solution as a lithium-intercalation electrode", Solid State Ionics, Jun. 2006, pp. 1341-1346, vol. 177, No. 15-16, North Holland Pub. Company, Amsterdam; NL, NL, XP025033729.
Lee et al., Li2NiO2 as a Novel Cathode Additive for Overdischarge Protection of Li-Ion Batteries, Chemistry Materials, Jan. 2008, pp. 5-7, vol. 20, No. I, XP055104578.
Xu et al., "Investigating Li2NiO2—Li2CuO2 Solid Solutions as High-Capacity Cathode Materials for Li-Ion Batteries", The Journal of Physical Chemistry C, May 11, 2017, pp. 11100-11107, vol. 121, No. 21, XP055698895.
International Search Report from Application No. PCT/KR2018/014723 dated Apr. 24, 2019, 2 pages.

* cited by examiner

[FIG. 1]
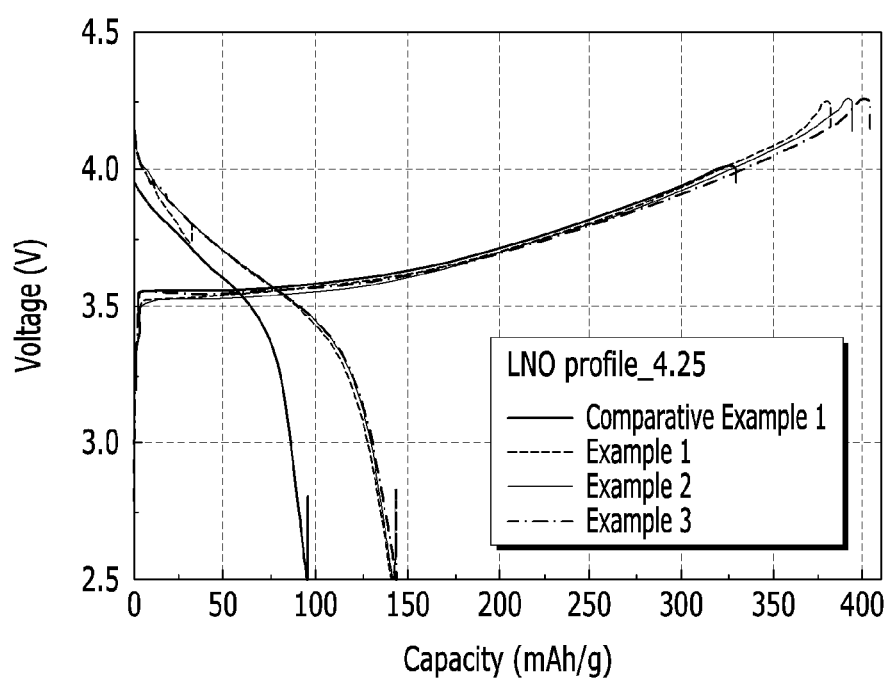

[FIG. 2]
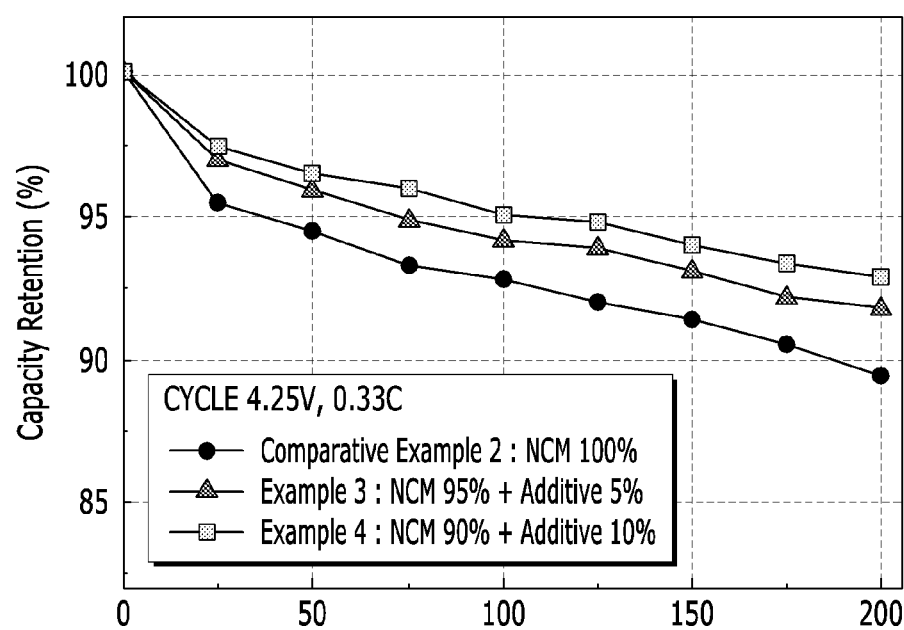

CATHODE ADDITIVE, PREPARATION METHOD THEREOF, AND CATHODE AND LITHIUM SECONDARY BATTERY COMPRISING THE SAME

CROSS-REFERENCE TO RELATED APPLICATION

The present application is a national phase entry under 35 U.S.C. § 371 of International Application No. PCT/KR2018/014723 filed Nov. 27, 2018, the disclosure of which is incorporated herein in its entirety by reference, which claims priority to and the benefit of Korean Patent Application No. 10-2017-0159732 filed on Nov. 27, 2017 and Korean Patent Application No. 10-2018-0143832 filed on Nov. 20, 2018 with the Korean Intellectual Property Office, the disclosures of which are herein incorporated by reference in their entirety.

TECHNICAL FIELD

The present disclosure relates to a cathode additive, a method for preparing the same, and a cathode and a lithium secondary battery including the same.

BACKGROUND ART

A lithium secondary battery uses electrode active materials capable of reversible intercalation and deintercalation of lithium ions, respectively in an anode and a cathode, realizes the transfer of lithium ions by an electrolyte, and produces electrical energy by the oxidation and reduction reactions in each electrode.

However, during the $1^{st}$ cycle charge-discharge of a lithium secondary battery, lithium ions that are intercalated in an anode (battery charge) and then deintercalated (battery discharge), and lithium ions that are deintercalated from a cathode (battery charge) and then cannot be recovered again (battery discharge), are necessarily generated. This is related to the irreversible capacity of both electrodes.

When the irreversible capacity difference of the electrodes is large, the initial efficiency of a cathode decreases, and the energy density gradually deceases during the operation of a battery, and thus the cycle life of a battery may decrease.

Technical Problem

One embodiment of the present disclosure provides a cathode additive that can offset an irreversible capacity imbalance, increase the initial charge capacity of a cathode, and simultaneously inhibit the generation of gas in a battery.

Technical Solution

The advantages and characteristics of the embodiments of the present disclosure, and methods for achieving the same will be clarified referring to the examples described below. However, the present disclosure is not limited by the examples disclosed below but can be realized in various forms, and the examples are presented only for better understanding of the present disclosure by a person having ordinary knowledge in the art, and the present disclosure is defined only by the claims.

Hereinafter, unless otherwise defined, the technical terms and scientific terms used herein have meanings which a person having ordinary knowledge commonly understands.

In addition, the repeated explanations of the technical constructions and actions identical to those of the prior art will be omitted.

Throughout the specification, when a part is "connected" with another part, it not only includes the case wherein they are "directly connected", but also includes the case wherein they are "electrically connected" with another device therebetween.

Throughout the specification, when a member is positioned "on" another member, it not only includes the case wherein a member contacts another member, but also includes a case wherein still another member exists between the two members.

Throughout the specification, when a part "comprises" a constructional element, unless described to the contrary, other constructional elements are not excluded, but other constructional elements can be further included.

The terms indicating a degree such as "about", "substantially", and the like used throughout the specification, when a tolerance of preparation and material unique to the mentioned meaning is presented, is used as a meaning close to the numerical value, and is used to prevent the disclosure mentioning an exact or absolute numerical value for understanding of the present disclosure being unreasonably used by an unprincipled infringer.

Throughout the specification, the term "~step" or "step of~" does not mean a "step for~".

Throughout the specification, the term "combination(s) thereof" included in the expression of a Markush-type means mixtures or combinations of one or more selected from the group consisting of the constructional elements described in the expression of the Markush-type, and means to include one or more selected from the group consisting of the constructional elements.

Throughout the specification, the description "A and/or B" means "A or B, or A and B".

Cathode Additive

One embodiment of the present disclosure provides a cathode additive of which the composition is represented by the following Chemical Formula 1.

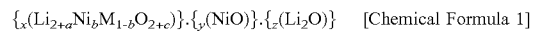  [Chemical Formula 1]

$\{_x(Li_{2+a}Ni_bM_{1-b}O_{2+c})\} \cdot \{_y(NiO)\} \cdot \{_z(Li_2O)\}$    [Chemical Formula 1]

In Chemical Formula 1, M is one or more metal atoms forming a divalent cation or a trivalent cation, for example, one or more metal atoms selected from the group consisting of Cu, Mg, Pt and Al, $-0.2 \leq a \leq 0.2$, $0.5 \leq b \leq 1.0$, $-0.2 \leq c \leq 0.2$, $0.7 \leq x \leq 1.0$, $0 < y \leq 0.15$, and $0 < z \leq 0.15$.

The cathode additive of one embodiment may include an excess amount of lithium compared to a common cathode active material including about 1 mole of lithium, and irreversibly discharge lithium during the initial charge/discharge of a battery.

Thus, the cathode additive of one embodiment may be applied in a cathode together with cathode active material to offset the irreversible capacity imbalance of two electrodes during the initial charge/discharge of a battery, and increase the initial efficiency of a cathode.

Specifically, the cathode additive of one embodiment may include lithium nickel oxide represented by the following Chemical Formula 1-1, nickel oxide (NiO), and lithium oxide ($Li_2O$), and may have the whole composition represented by the above Chemical Formula 1:

  [Chemical Formula 1-1]

$Li_{2+a}Ni_bM_{1-b}O_{2+c}$    [Chemical Formula 1-1]

wherein, in Chemical Formula 1-1,

M, a, b, and c are as defined in Chemical Formula 1.

It may be prepared using nickel-based oxide (($Ni_dM_{1-d}$)$O_x$ (wherein M is a metal atom forming a divalent cation or a trivalent cation, $0.5 \leq d \leq 1.0$, $1.8 \leq x \leq 2.2$), and lithium oxide ($Li_2O$) as raw materials.

Theoretically, when mixing the nickel-based oxide (($Ni_dM_{1-d}$)$O_x$ and the lithium oxide ($Li_2O$) at a stoichiometric mole ratio of 1:1 and heat treating the mixture, the total amount mixed may react at a mole ratio of 1:1 to form the lithium nickel oxide represented by Chemical Formula 1-1, and non-reacted raw materials may not remain.

However, in a practical process, even if the nickel-based oxide (($Ni_dM_{1-d}$)$O_x$ and the lithium oxide ($Li_2O$) are mixed at a mole ratio of 1:1 and heat-treated, the total amount mixed may not react at a mole ratio of 1:1, and non-reacted raw materials may necessarily remain. In the studies known so far, non-reacted raw materials were handled as simple impurities and removed, and only a material having a theoretical composition (namely, a lithium nickel oxide represented by Chemical Formula 1-1) was recovered and used as a cathode additive.

As such, in the present study, unlike the studies known so far, non-reacted raw materials are not removed, but are recovered together with a material having a theoretical composition (namely, a lithium nickel oxide represented by Chemical Formula 1-1), and used as the cathode additive of one embodiment. Such a cathode additive, due to the existence of the non-reacted raw materials, particularly lithium oxide ($Li_2O$), can provide extra Li for a cathode, and further increase the initial charge capacity of a cathode, which was unexpected and to the contrary of the then-current understanding in the art.

Specifically, the cathode additive of one embodiment may be obtained by mixing nickel-based oxide and lithium oxide ($Li_2O$) at a stoichiometric mole ratio of 1:1.02 to 1:0.98 and then heat treating the mixture, without the removal process of non-reacted raw materials.

In the resulting cathode additive of one embodiment, the lithium nickel oxide represented by Chemical Formula 1-1, the nickel oxide (NiO), and the lithium oxide ($Li_2O$) may be respectively detected as crystalloid by XRD (X-Ray Diffraction) by Fe Kα X-ray (X-rα).

Namely, if the cathode additive of one embodiment is analyzed qualitatively and quantitatively using XRD (X-Ray Diffraction) by Fe Kα X-ray (X-rα), existence of the lithium nickel oxide represented by Chemical Formula 1-1, the nickel oxide (NiO), and the lithium oxide ($Li_2O$) and each amount thereof may be confirmed.

Specifically, by XRD (X-Ray Diffraction) measurement by Fe Kα X-ray (X-rα), the appearance of a main peak in at least one of a range in which 2θ is 30 to 35°, a range in which 2θ is 35 to 40°, or a range in which 2θ is 55 to 60° may be considered to be due to the lithium oxide ($Li_2O$).

It may appear with intensity of greater than 0 and equal to or less than 15, specifically greater than 0 and equal to and less than 14, greater than 0 and equal to and less than 13, or greater than 0 and equal to or less than 12, when the intensity of the main peak of the lithium nickel oxide represented by Chemical Formula 1-1 is considered to be 100 (Ref.). Thus, it can be seen that the content of lithium oxide ($Li_2O$) in the total amount of the cathode additive (100 wt %) is greater than 0 wt % and equal to or less than 15 wt %, specifically greater than 0 wt % and equal to or less than 14 wt %, greater than 0 wt % and equal to or less than 13 wt %, or greater than 0 wt % and equal to or less than 12 wt %.

Further, by XRD (X-Ray Diffraction) measurement by Fe Kα X-ray (X-rα), the appearance of a main peak in at least one of a range in which 2θ is 35 to 40°, a range in which 2θ is 40 to 45°, or a range in which 2θ is 50 to 55° may be considered to be due to the nickel oxide (NiO).

It may appear with intensity of greater than 0 and equal to or less than 15, specifically, greater than 0 and equal to or less than 14, greater than 0 and equal to or less than 13, or greater than 0 and equal to or less than 12, when the intensity of the main peak of the lithium nickel oxide represented by Chemical Formula 1-1 is considered as 100 (Ref.). Thus, it can be seen that the content of nickel oxide (NiO) in the total amount of the cathode additive (100 wt %) is greater than 0 wt % and equal to or less than 15 wt %, specifically greater than 0 wt % and equal to or less than 14 wt %, greater than 0 wt % and equal to or less than 13 wt %, or greater than 0 wt % and equal to or less than 12 wt %.

Finally, by XRD (X-Ray Diffraction) measurement by Fe Kα X-ray (X-rα), a main peak may appear in at least one a range in which 2θ is 18 to 21°, a range in which 2θ is 24 to 27°, or a range in which 2θ is 43 to 46°. Such a main peak may appear by an orthorhombic crystal structure with a point group of Immm, and it may be due to the lithium nickel oxide represented by Chemical Formula 1-1.

The content may be calculated by subtracting the content of the lithium oxide ($Li_2O$) and the content of the nickel oxide (NiO) from the total amount of the cathode additive (100 wt %).

Comprehensively considering the results of the quantitative analysis and the qualitative analysis, it can be seen that the lithium nickel oxide represented by Chemical Formula 1-1, the nickel oxide (NiO) and the lithium oxide ($Li_2O$) are included in the cathode additive of one embodiment, and the whole composition is as shown in Chemical Formula 1. Specifically, in Chemical Formula 1, x, y, and z are respectively related to the weight ratios of the lithium nickel oxide represented by Chemical Formula 1-1, the nickel oxide (NiO), and the lithium oxide ($Li_2O$).

For example, in Chemical Formula 1, $0.7 \leq x < 1.0$, $0 < y \leq 0.15$, and $0 < z \leq 0.15$; $0.72 \leq x < 1.0$, $0 < y \leq 0.14$, and $0 < z \leq 0.14$; $0.74 \leq x \leq 1.0$, $0 < y \leq 0.13$, and $0 < z \leq 0.13$; $0.74 \leq x < 1.0$, $0 < y \leq 0.13$, and $0 < z \leq 0.13$; or $0.76 \leq x < 1.0$, $0 < y \leq 0.12$, and $0 < z \leq 0.12$. Although synergistic effects may be obtained by each component in the above ranges, these ranges are no more than examples, and the present disclosure is not limited thereby.

In the cathode additive of one embodiment, the forms of existence of the lithium nickel oxide represented by Chemical Formula 1-1, the nickel oxide (NiO) and the lithium oxide ($Li_2O$) are not specifically limited. For example, they may exist in the form of a composite in which the nickel oxide (NiO) particles and the lithium oxide ($Li_2O$) particles may be attached on the surface of the lithium nickel oxide represented by Chemical Formula 1-1, or may exist in the form of a mixture in which the nickel oxide (NiO) particles and the lithium oxide ($Li_2O$) particles are not attached to the lithium nickel oxide represented by Chemical Formula 1-1, but separately exist. Here, the "particles" may be primary particles or secondary particles formed by the agglomeration of the primary particles.

The cathode additive of one embodiment may irreversibly discharge lithium ions and oxygen at the initial charge voltage of a battery, for example, 2.5 to 4.25 V (vs. Li/Li$^+$), and thereafter, the whole composition may be converted into the following Chemical Formula 2.

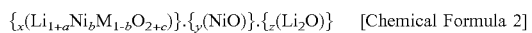  [Chemical Formula 2]

(In Chemical Formula 2, M, a, b, c, x, y, and z are as defined in Chemical Formula 1, respectively.)

In the cathode additive converted into Chemical Formula 2, $Li_{2+a}Ni_bM_{1-b}O_{2+c}$ is capable of reversible intercalation/deintercalation of lithium ions, like a common cathode active material. Thus, the cathode additive of one embodiment may be utilized as an additive for compensating the initial irreversible capacity of an anode, and as an active material enabling the reversible intercalation/deintercalation of lithium.

However, the cathode additive converted into Chemical Formula 2 may have a small reversible capacity compared to common cathode active materials, specifically, a reversible capacity of 300 to 350 mAh/g, due to the Li content and structural limitations. Thus, in case the initial performance of a battery is to be improved while simultaneously securing a long-term life cycle characteristic, cathode active materials may be combined with the cathode additive of one embodiment at an appropriate mixing ratio according to the desired battery properties.

Method for Preparing a Cathode Additive

In another embodiment of the present disclosure, a method for preparing a cathode additive includes steps of: preparing a nickel-based oxide represented by the following Chemical Formula 3; and heat treating a mixture of the nickel-based oxide and lithium oxide ($Li_2O$). By the preparation method, the cathode additive discussed above may be obtained.

   [Chemical Formula 3]

$(Ni_dM_{1-d})O_x$   [Chemical Formula 3]

In Chemical Formula 3, M is a metal atom forming a divalent cation or a trivalent cation, $0.5 \leq d \leq 1.0$, and $1.8 \leq x \leq 2.2$.

In the preparation method of this embodiment, the step of preparing the nickel-based oxide represented by Chemical Formula 3 may be a step of heat treating the nickel oxide ($Ni(OH)_2$) alone; or a mixture of the nickel oxide ($Ni(OH)_2$) and an M-containing compound.

The heat treatment of the nickel oxide ($Ni(OH)_2$) alone, or a mixture of the nickel oxide ($Ni(OH)_2$) and the M-containing compound, may be conducted at a temperature range of 500 to 700° C. for 5 to 20 hours.

In this step, in case the nickel oxide ($Ni(OH)_2$) is heat treated alone, a nickel oxide ($NiO_x$) of Chemical Formula 3 wherein d is 0 may be formed. On the contrary, in case the mixture of the nickel oxide ($Ni(OH)_2$) and the M-containing compound is heat treated, an M-doped nickel-based oxide ($[Ni_dM_{1-d}]O_x$) wherein d is not 0 may be formed.

Continuing with this embodiment of the preparation method, the step of heat treating a mixture of the nickel-based oxide and lithium oxide ($Li_2O$) may include mixing the nickel-based oxide and the lithium oxide at a mole ratio of 1:1 (±0.02), and heat treating the mixture at a temperature range of 600 to 800° C. for 10 to 20 hours under an inert atmosphere.

When heat treating the mixture of the nickel oxide and the lithium oxide ($Li_2O$), the total amount mixed may not react at a mole ratio of 1:1, and thus a part of the nickel-based oxide ($(Ni_dM_{1-d})O_x$) and a part of the lithium oxide ($Li_2O$) may react to form a lithium nickel oxide represented by the above Chemical Formula 1-1, and as such non-reacted raw materials may remain. The resulting composition of the obtained product and the effects thereof are as explained above.

Cathode Mixture

Yet another embodiment of the present disclosure provides a cathode mixture including the above-explained cathode additive, and a cathode active material.

Since the cathode mixture of one embodiment uses the above-explained cathode additive, the initial irreversible capacity of an anode may be decreased compared to the case wherein the cathode additive is not used, thereby increasing the initial efficiency of a cathode.

For example, in the total amount (100 wt %) of the cathode mixture of one embodiment, the cathode additive may be used in the content of 1 to 30 wt %. Specifically, when the cathode additive is mixed in the above range, the initial irreversible capacity of an anode may be sufficiently decreased during the initial charge/discharge of a battery (i.e., during the $1^{st}$ cycle), and then reversible intercalation and deintercalation of lithium ions may be stably achieved by the cathode active material during the subsequent charge/discharge (i.e., the $2^{nd}$ cycle and beyond).

In addition, the cathode mixture of one embodiment may be realized according to the particulars commonly known in the art. Hereinafter, although particulars commonly known in the art will be briefly presented, these are no more than examples, and the cathode mixture of one embodiment is not limited thereby.

The cathode active material is not specifically limited as long as it is material capable of reversible intercalation and deintercalation of lithium ions. For example, it may include one or more composite oxides of: a metal of cobalt, manganese, nickel or a combination thereof; and lithium.

More specifically, as the cathode active material, a compound represented by any one of the following chemical formulas may be used: $Li_aA_{1-b}R_bD_2$ (wherein $0.90 \leq a \leq 1.8$ and $0 \leq b \leq 0.5$); $Li_aE_{1-b}R_bO_{2-c}D_c$ (wherein $0.90 \leq a \leq 1.8$, $0 \leq b \leq 0.5$, and $0 \leq c \leq 0.05$); $LiE_{2-b}R_bO_{4-c}D_c$ (wherein $0 \leq b \leq 0.5$ and $0 \leq c \leq 0.05$); $Li_aNi_{1-b-c}Co_bR_cD_\alpha$ (wherein $0.90 \leq a \leq 1.8$, $0 \leq b \leq 0.5$, $0 \leq c \leq 0.05$, and $0 \leq \alpha \leq 2$); $Li_aN_{1-b-c}CO_bR_cO_{2-\alpha}Z_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bR_cO_{2-\alpha}Z_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bR_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bR_cO_{2-\alpha}Z_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bR_cO_{2-\alpha}Z_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $FePO_4$.

In the above chemical formulas, A is Ni, Co, Mn, or a combination thereof; R is Al, Ni, Co, Mn, Cr, Fe, Mg, Sr, V, a rare earth atom, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The compound may have a coating layer on the surface, or the compound may be used in combination with a compound having a coating layer. The coating layer may include, as a coating element compound, an oxide or hydroxide of the coating element, an oxyhydroxide of the coating element, an oxycarbonate of the coating element, or a hydroxycarbonate of the coating element. A compound making up the coating layer may be amorphous or crystalline. As the coating element included in the coating layer, Mg, Al, Co, K, Na, Ca, Si, Ti, V, Sn, Ge, Ga, B, As, Zr, or a mixture thereof may be used. As the process of forming the coating layer, any coating method may be used as long as it can coat these elements on the compound without adversely influencing the properties of the cathode active material (for example, spray coating, dipping, etc.), and since it can be easily understood by one or ordinary knowledge in the art, the detailed explanations thereof will be omitted.

The cathode mixture of one embodiment may further include a conductive material, a binder, or a mixture thereof. The conductive material is used to provide conductivity to an electrode, and any materials may be used as long as they are electrically conductive materials without causing chemical changes, and for example, metal powders or metal fibers such as natural graphite, artificial graphite, carbon black, acetylene black, Ketjen black, carbon fiber, copper, nickel, aluminum, silver, etc. may be used, and one kind or one or more kinds of conductive materials such as polyphenylene derivatives, etc. may be used in combinations.

The binder performs the functions for sufficiently attaching the cathode active material particles, and sufficiently attaching the cathode active material to a current collector, and as representative examples, polyvinyl alcohol, carboxymethyl cellulose, hydroxypropyl cellulose, diacetyl cellulose, polyvinyl chloride, carboxylated polyvinyl chloride, polyvinyl fluoride, ethylene oxide containing polymer, polyvinyl pyrrolidone, polyurethane, polytetrafluoroethylene, polyvinylidene fluoride, polyethylene polypropylene styrene-butadiene rubber, acrylated styrene-butadiene rubber, epoxy resin, nylon, etc. may be used, but is not limited thereto.

Lithium Secondary Battery

Yet another embodiment of the present disclosure provides a lithium secondary battery including: a cathode including the above-explained cathode mixture; an electrolyte; and an anode.

Since the lithium secondary battery uses the above-explained cathode additive together with a cathode active material in a cathode, the initial irreversible capacity of an anode may be decreased, the initial efficiency of a cathode may be increased, and a decrease in energy density during the operation may be inhibited, and thus an excellent life cycle characteristic may be exhibited.

In the lithium secondary battery of one embodiment, particulars other than the above-explained cathode additive and cathode mixture may be realized according to particulars commonly known in the art.

Hereinafter, although particulars commonly known in the art will be briefly presented, the cathode mixture of one embodiment is not limited thereby.

The cathode may include a cathode current collector, and a cathode mixture layer including the above-explained cathode mixture positioned on the cathode current collector.

Specifically, the cathode may be prepared by coating an electrode mixture of a cathode active material, a conductive material, and/or a binder on the cathode current collector and then drying it, and if necessary, a filler may be further added to the mixture.

The cathode current collector may be generally formed with a thickness of 3~500 μm. Such a cathode current collector is not specifically limited as long as it has high conductivity without inducing chemical changes in a battery. For example, stainless steel, aluminum, nickel, titanium, baked carbon, or aluminum or stainless steel of which surface is treated with carbon, nickel, titanium, silver, etc. may be used. The collector may have fine unevenness on the surface to increase adhesion of the cathode active material, and it may be in various forms such as a film, a sheet, a foil, a net, a porous body, a foaming body, a non-woven fabric body, etc.

The conductive material is commonly added in the content of 1 to 50 wt %, based on the total weight of the mixture including the cathode active material. Such conductive material is not specifically limited as long as it has conductivity without inducing chemical changes in a battery, and for example, graphite such as natural graphite or artificial graphite; carbon black such as carbon black, acetylene black, Ketjen black, channel black, furnace black, lamp black, summer black, etc.; a conductive fiber such as a carbon fiber, a metal fiber, etc.; a metal powder such as fluorinated carbon, aluminum, nickel powder, etc.; conductive whiskers such as zinc oxide, potassium titanate, etc.; a conductive metal oxide such as titanium oxide, etc.; or a conductive material such as polyphenylene derivatives, etc., may be used.

Meanwhile, an elastic graphite-based material may be used as the conductive material, and it may be used in combination with the above-described materials.

The binder is a component assisting in the bonding of the active material and the conductive material, and the bonding to a current collector, and commonly, it is added in the content of 1 to 50 wt % based on the total weight of the mixture including the cathode active material. Examples of the binder may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene terpolymer (EPDM), sulfonated EPDM, styrene butylene rubber, a fluorine-containing rubber, various copolymers, etc.

The filler is selectively used for a component for inhibiting the expansion of a cathode, and is not specifically limited as long as it is a fibrous material without inducing chemical changes in a battery, and for example, an olefin-based polymer such as polyethylene, polypropylene, etc.; fibrous materials such as glass fiber, carbon fiber, etc., may be used.

The anode includes a current collector and an anode active material layer formed on the current collector, and the anode active material layer may include an anode active material.

As the anode active material, one or more selected from the group consisting of a carbon-based anode active material, lithium metal, a lithium alloy, Si, $SiO_x$ ($0<x<2$), a Si—C composite, a Si-Q alloy (Q is alkali metal, an alkali earth metal, atoms of Group 13 to 16, a transition metal, rare earth atoms, or a combination thereof, provided that it is not Si), Sn, $SnO_2$, a Sn—C composite, and Sn—R (R is an alkali metal, an alkali earth metal, atoms of Groups 13 to 16, a transition metal, a rare earth metal, or a combination thereof, provided that it is not Sn) may be used.

The anode current collector may be generally formed with a thickness of 3~500 μm. Such an anode current collector is not specifically limited as long as it has conductivity without inducing chemical changes in a battery, and for example, copper, stainless steel, aluminum, nickel, titanium, baked carbon, or copper or stainless steel of which surface is treated with carbon, nickel, titanium, silver, etc., aluminum-cadmium alloy, etc., may be used. Further, like the cathode current collector, fine unevenness may be formed on the surface to increase the bonding force of the anode active material, and it may be in various forms such as a film, a sheet, a foil, a net, a porous body, a foaming body, a non-woven fabric body, etc.

The lithium secondary battery of one embodiment may be a lithium ion battery, a lithium ion polymer battery, or a lithium polymer battery according to the kind of electrolyte and/or the kind of a separator.

When the lithium secondary battery of one embodiment is a lithium ion battery applying a liquid electrolyte, the liquid electrolyte may be impregnated in a separator. The separator is interposed between a cathode and an anode, and a thin insulating film having high ion permeability and mechanical strength may be used therefor. The pore diameter of the separator is generally 0.01-10 μm, and the thickness is generally 5~300 μm. As such a separator, for example, an olefin-based polymer such as a chemical resistant and hydrophobic polypropylene, etc.; or a sheet or non-woven fabric, etc. made of glass fiber or polyethylene, etc., may be used. In case a solid electrolyte such as a polymer is used as the electrolyte, the solid electrolyte may also serve as a separator.

The liquid electrolyte may be a non-aqueous electrolyte containing lithium salt. The lithium salt-containing, non-aqueous electrolyte is composed of a non-aqueous electrolyte and lithium, and as the non-aqueous electrolyte, non-aqueous organic solvents, an organic solid electrolyte, an inorganic solid electrolyte, etc. may be used, but is not limited thereto.

As examples of the non-aqueous electrolytic solution, mention may be made of aprotic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc., may be used.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulfates of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, a lower aliphatic carboxylic acid lithium, lithium tetraphenyl borate, and an imide.

Additionally, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the lithium salt-containing non-aqueous electrolyte. According to circumstances, in order to impart incombustibility, the non-aqueous electrolyte may further include halogen-containing solvents, such as carbon tetrachloride and ethylene trifluoride. Furthermore, in order to improve high-temperature storage characteristics, the non-aqueous electrolyte may additionally include carbon dioxide gas, FEC (fluoro-ethylene carbonate), PRS (propene sultone), and the like.

For example, the lithium salt-containing, non-aqueous electrolyte may be prepared by adding lithium salt such as $LiPF_6$, $LiClO_4$, $LiBF_4$, $LiN(SO_2CF_3)_2$, etc. to a mixed solvent of a solvent having a high dielectric constant such as EC or PC and a solvent having low viscosity such as DEC, DMC, or EMC.

The lithium secondary battery of one embodiment may be realized as a battery module including the lithium secondary battery as a unit cell, a battery pack including the battery module, and a device including the battery pack as a power source.

Specific examples of the device may include an electric vehicle, a hybrid electric vehicle, a plug-in hybrid electric vehicle, or an electric power storage system, but are not limited thereto.

Effect of the Present Disclosure

According to the lithium secondary battery applying the cathode additive of one embodiment as part of a cathode, the initial irreversible capacity of an anode may be decreased, the initial capacity and efficiency of such a cathode may be efficiently increased, and a decrease in energy density during the operation may be inhibited, thus an excellent life cycle characteristic can be exhibited.

BRIEF DESCRIPTION OF DRAWING

FIG. 1 is a graph showing the initial charge/discharge property of each lithium secondary battery of Examples 1 to 3 and Comparative Example 1.

FIG. 2 is graph showing the long-term charge/discharge property (capacity retention) of each battery of Comparative Example 2 and Examples 4 and 5.

DETAILED DESCRIPTION OF THE EMBODIMENTS

Hereinafter, the actions and the effects of the present disclosure will be explained in more detail through specific examples of the present disclosure. However, these examples are presented only as illustrations of the present disclosure, and the scope of the right of the present disclosure is not limited thereby.

I. Confirmation of the Structure and Advantages of a Cathode Additive Including Lithium Nickel Oxide, Nickel Oxide (NiO), and Lithium Oxide ($Li_2O$)

Example 1: $\{_x(Li_2NiO_2)\}.\{y(NiO)\}.\{z(Li_2O)\}$, x=0.86, y=0.07, z=0.07

(1) Preparation of Cathode Additive

A nickel hydroxide precursor, $Ni(OH)_2$, was heat treated under an inert atmosphere of 600° C. for 10 hours to obtain a nickel-based oxide NiO.

The nickel-based oxide NiO was mixed with lithium oxide ($Li_2O$) at a mole ratio ($NiO:Li_2$) of 1:1.1, and heat treated at 680° C. (inert atmosphere) for 18 hours. At this time, the heating and cooling rates were fixed to 5° C. per minute.

After the heat treatment was finished, $\{_x(Li_2NiO_2)\}\cdot\{y(NiO)\}\cdot\{z(Li_2O)\}$, x=0.86, y=0.07, z=0.07, was finally obtained, which was designated as a cathode additive of Example 1.

The above chemical formula was calculated from Experimental Example 1 described below.

(2) Manufacture of a Cathode and a Lithium Secondary Battery (Coin Half Cell)

A cathode was prepared using the cathode additive of Example 1, and a lithium secondary battery including the prepared cathode was manufactured.

Specifically, the cathode additive of Example 1, $\{_{0.86}(Li_2NiO_2)\}\cdot\{_{0.07}NiO\}\cdot\{_{0.07}Li_2O\}$, a conductive material (Super-P, Denka black), and a binder (PVdF) were mixed in an organic solvent (NMP) at a weight ratio of 85:10:5 (cathode additive:conductive material:binder), to prepare a cathode mixture in the form of a slurry, and then the cathode mixture was coated on an aluminum current collector and dried in a vacuum oven at 120° C. for 30 minutes to prepare a cathode.

As a counter electrode, Li-metal was used, and as an electrolyte, a solution of 2 wt % of VC dissolved in a mixed solvent of ethylene carbonate (EC) and dimethyl carbonate (DMC) at a volume ratio of 1:2 was used.

A 2032 half coin cell was manufactured using the above-described constructional elements, according to a common manufacturing method.

Example 2: $\{_x(Li_2NiO_2)\}\cdot\{_y(NiO)\}\cdot\{_z(Li_2O)\}$, x=0.80, y=0.10, z=0.10

(1) Preparation of Cathode Additive $\{_x(Li_2NiO_2)\}\cdot\{_y(NiO)\}\cdot\{_z(Li_2O)\}$, x=0.80, y=0.10, z=0.10, was obtained by the same method as Example 1, except that the nickel-based oxide NiO was mixed with lithium oxide ($Li_2O$) at a mole ratio of 1:1.2, and it was designated as a cathode additive of Example 2.

The above chemical formula was calculated from Experimental Example 1 described below.

(2) Manufacture of a Cathode and a Lithium Secondary Battery (Coin Half Cell)

The cathode and lithium secondary battery of Example 2 were manufactured by the same method as Example 1, except that the cathode additive of Example 2 was used instead of the cathode additive of Example 1.

Example 3: $\{_x(Li_2NiO_2)\}\cdot\{_y(NiO)\}\cdot\{_z(Li_2O)\}$, x=0.76, y=0.12, z=0.12

(1) Preparation of Cathode Additive $\{_x(Li_2NiO_2)\}\cdot\{_y(NiO)\}\cdot\{_z(Li_2O)\}$, x=0.76, y=0.12, z=0.12, was obtained by the same method as Example 1, except that the nickel-based oxide NiO was mixed with lithium oxide ($Li_2O$) at a mole ratio of 1:1.3, and the above Chemical Formula was calculated from Experimental Example 1 described below.

(2) Manufacture of a Cathode and a Lithium Secondary Battery (Coin Half Cell)

The cathode and lithium secondary battery of Example 3 were manufactured by the same method as Example 1, except that the cathode additive of Example 3 was used instead of the cathode additive of Example 1.

Comparative Example 1: $_x(Li_2NiO_2)$, x=0.86

(1) Preparation of Cathode Additive

A cathode additive was prepared by the same method as Example 1, and then non-reacted nickel-based oxide NiO and lithium oxide ($Li_2O$) were sieved through a 400 mesh sieve to finally obtain $_x(Li_2NiO_2)$, x=0.86, having an orthorhombic crystal structure with a point group of Immm, which was designated as the cathode additive of Comparative Example 1.

(2) Manufacture of a Cathode and a Lithium Secondary Battery (Coin Half Cell)

The cathode and lithium secondary battery of Comparative Example 1 were manufactured by the same method as Example 1, except that the cathode additive of Comparative Example 1 was used instead of the cathode additive of Example 1.

Experimental Example 1: XRD Analysis

For each cathode additive of Examples 1 to 3 and Comparative Example 1, XRD (X-Ray Diffraction) analysis by Cu Kα X ray (X-rα) was conducted, and the results are recorded in the following Table 1.

Specifically, lithium nickel oxide and the nickel oxide (NiO) can be detected as crystalloids, through XRD (X-Ray Diffraction) by Cu Kα X ray (X-rα).

Particularly, quantitative analysis results were obtained through the calculation of intensity after XRD (X-Ray Diffraction) analysis.

TABLE 1

| | Structural analysis | | | | Quantitative analysis | |
|---|---|---|---|---|---|---|
| | Cell parameter | | | | | |
| | (Å) | | Volume | Crystallite | NiO | $Li_2O$ |
| | a axis | c axis | (Å$^3$) | size (nm) | (wt %) | (wt %) |
| Comparative Example 1 | 2.779 | 9.025 | 93.98 | 182 | 0 | 0 |
| Example 1 | 2.779 | 9.026 | 94.01 | 182 | 7 | 7 |
| Example 2 | 2.779 | 9.028 | 93.96 | 205 | 10 | 10 |
| Example 3 | 2.780 | 9.028 | 93.96 | 210 | 12 | 12 |

It is already known that Comparative Example 1 has an orthorhombic crystal structure with a point group of Immm. Further, from the results of structural analysis of Table 1, it can be seen that Comparative Example 1 and Examples 1 to 3 have identical crystal structures. Thus, it can be seen that Examples 1 to 3 also include a compound represented by $Li_{2+a}Ni_bM_{1-b}O_{2+c}$.

From the results of quantitative analysis of Table 1, it can be confirmed that $Li_2O$ was not detected in Comparative Example 1. However, it can be confirmed that in Examples 1 to 3, based on the total amount (100 wt %), 7 wt % (Example 1), 10 wt % (Example 2), and 12 wt % (Example 3) of $Li_2O$ were respectively detected.

Experimental Example 2: Evaluation of the Initial Charge/Discharge Property of a Battery Applying Additive For each battery of Examples 1 to 3 and Comparative Example 1, the initial charge/discharge property was evaluated under the following conditions. The results of evaluation are recorded in FIG. 1 and Table 2.

Charge: 0.1 C, CC/CV, 4.25 V, 0.05 C cut-off
Discharge: 0.1 C, CC, 2.5 V, cut-off According to FIG. 1 and Table 2, it can be confirmed that in Examples 1 to 3, the initial irreversible capacity of an anode decreased and the initial efficiency of a cathode increased, compared to Comparative Example 1.

TABLE 2

| 1$^{st}$ Cycle | | 0.1 C Charge (mAh/g) | 0.1 C Discharge (mAh/g) | Cathode Efficiency (%) |
|---|---|---|---|---|
| Capacity (mAh/g) | Comparative Example 1 | 329.8 | 95.2 | 28.9 |
| | Example 1 | 382 | 142.3 | 37.3 |
| | Example 2 | 394.2 | 142.8 | 36.2 |
| | Example 3 | 402.2 | 143.6 | 35.7 |

In Examples 1 to 3, in order to confirm the effect of improvement in the initial performance of a battery by the cathode additive of one embodiment, a cathode mixture was prepared using each cathode additive in the same amount as the common cathode active material, and a cathode and a lithium secondary battery were manufactured.

As explained above, the cathode additive of one embodiment can irreversibly discharge lithium ions and oxygen at the initial charge voltage, for example, 2.5 to 4.25 V (vs. Li/Li$^+$), and then can be converted into a composition capable of reversible intercalation and deintercalation of lithium ions. Thus, as in Examples 1 to 3, the cathode additive of one embodiment may be utilized as an additive for compensating the initial irreversible capacity of an anode, and also as an active material enabling reversible intercalation and deintercalation of lithium.

However, since it may have small reversible capacity compared to a common cathode active material due to the Li content and the structural limitations, in case the initial performance of a battery is to be simultaneously improved while securing the long-time life cycle characteristics, the cathode additive of one embodiment may be combined with the cathode active material at an appropriate mixing ratio according to the desired properties of a battery.

III. Examples of Practical Application Forms of a Cathode Additive Including Lithium Nickel Oxide, Nickel Oxide (NiO), and Lithium Oxide (Li$_2$O)

Examples 4 and 5: Application of the Cathode Additive of Example 1 in Combination with the Cathode Active Material For the practical application form of the cathode additive of Example 1, the cathode additive of Example 1 was used in combination with a cathode active material prepare a cathode, and a lithium secondary battery including the prepared cathode was manufactured.

Specifically, the cathode additive of Example 1 ({$_x$(Li$_2$NiO$_2$)}·{$_y$(NiO)}·{$_z$(Li$_2$O)}, x=0.86, y=0.07, z=0.07), the cathode active material of NCM (LiNi$_{0.8}$Co$_{0.1}$Mn$_{0.1}$O$_2$), the conductive material (Super-P, Denka Black), and a binder (PVdF) were mixed in an organic solvent (NMP) to prepare a cathode mixture in the form of a slurry, and then the cathode mixture was coated on an aluminum current collector and dried in a vacuum oven at 120° C. for 30 minutes to manufacture each cathode of Example 4 and 5.

In Examples 4 and 5, the weight ratios of the cathode additive of Example 1:cathode active material:conductive material:binder were 4.825:91.675:1.5:2 (Example 4) and 9.65:86.85:1.5:2.0 (Example 5), respectively.

Each 2032 half coin cell was manufactured by the same method as Example 1, using each cathode of Examples 4 and 5 instead of the cathode of Example 1

Comparative Example 2: Application of Cathode Active Material Alone

A cathode was prepared by the same method as Example 1, except that no cathode additive was used, and instead of the cathode additive of Example 1, the same amount of cathode active material (LiNi$_{0.8}$Co$_{0.1}$Mn$_{0.1}$O$_2$) was used, and a lithium secondary battery including the prepared cathode was manufactured.

Experimental Example 3: Evaluation of the Practical Application Form of a Cathode Additive (Evaluation of the Properties of the Initial Capacity and Life Cycle Characteristics of a Battery)

Specifically, charge/discharge of each battery of Comparative Example 2 and Examples 4 and 5 was progressed at a room temperature of 25° C. under the following conditions. The results are shown in FIG. 2 and Table 3.

Charge: 0.2 C, CC/CV, 4.25 V, 0.005 C cut-off
Discharge: 0.2 C, CC, 2.5 V, cut-off According to FIG. 2 and Table 3, it is confirmed that, compared to the case of using the cathode active material only (Comparative Example 2), in the case where the cathode additive of Example 1 was used in combination with the cathode active material (Examples 3 and 4), both the initial charge capacity and the life cycle characteristics of a battery are improved.

TABLE 3

| | Composition of additive and weight ratio of additive and active material | | Initial operation property of battery | | Long term operation property of battery | | |
|---|---|---|---|---|---|---|---|
| | ({$_x$(Li$_2$NiO$_2$)}·{$_y$(NiO)}·{$_z$(Li$_2$O)}) | Additive:Active material (weight ratio) | 0.2 C Charge (mAh/g) | 0.2 C Discharge (mAh/g) | Capacity Retention (%, @ 30$^{th}$ cycle) | Capacity Retention (%, @ 100$^{th}$ cycle) | Capacity Retention (%, @ 200$^{th}$ cycle) |
| Comparative Example 2 | — | Active material 100% (Ref.) | 226.1 | 206.2 | 95.1 | 92.8 | 89.5 |
| Example 3 | x = 0.86, y = 0.07, z = 0.07 | 5:95 | 235.7 | 204.5 | 96.5 | 94.2 | 91.8 |
| Example 4 | x = 0.86, y = 0.07, z = 0.07 | 10:90 | 243.0 | 199.2 | 96.6 | 95.1 | 92.9 |

Putting the above results and Experimental Examples 1 to 2 together, it can be confirmed that the cathode additive including the lithium nickel oxide, the nickel oxide (NiO), and the lithium oxide ($Li_2O$) irreversibly discharges lithium ions and oxygen preferentially over the cathode active material at the initial charge voltage of a battery, thereby compensating the initial irreversible capacity of an anode and increasing the initial charge capacity of a cathode.

Moreover, according to FIG. 2 and Table 3, it can be confirmed that when the cycle number of a battery is identical, the capacity retention rates of Examples 3 and 4 are remarkably high, compared to the capacity retention rates of Comparative Example 2.

Such a difference in the capacity retention rates becomes severe as the cycle number of a battery increases, and particularly, it is confirmed that in Comparative Example 2, after the operation of 100 cycles, 92.8% of the initial capacity is maintained, and after the operation of 200 cycles, 89.5% is maintained. On the other hand, it is confirmed that in the case of Examples 3 and 4, after the operation of 100 cycles, 94.2% or more of the initial capacity is maintained, and even after the operation of 200 cycles, 91.8% or more of the initial capacity is maintained.

This means that in cases where battery cycles are progressed to a greater number of cycles, the cathode additive of these embodiments provide for an increase in the initial capacity, with the added benefit of a lower capacity loss over the life cycle of the battery. It also means that after the cathode additive of these embodiments irreversibly discharges lithium ions and oxygen at the initial charge voltage of a battery, it is converted into a composition capable of reversible intercalation and deintercalation of lithium ions, which may at least partly contribute to the capacity being maintained even through the progression of battery cycles.

Meanwhile, among Examples 3 and 4, in Example 4 wherein a cathode mixture including a higher content of a cathode additive of one embodiment is used, the initial charge capacity and the cycle life characteristic of a battery are further improved. This means that as a cathode mixture including a high content of a cathode additive of one embodiment is used, the initial charge capacity of a battery is further improved, and thus the cycle life characteristic can be more effectively improved.

Thus, as explained above, in case the initial performance of a battery is to be improved while simultaneously securing the long-term life cycle characteristic, the cathode additive of one embodiment may be used in combination with the cathode active material at an appropriate mixing ratio, according to the desired battery properties.

The invention claimed is:

1. A cathode mixture comprising:
a cathode active material including one or more composite oxides of: a metal of cobalt, manganese, nickel, and lithium, wherein the composite oxide includes cobalt, manganese, nickel, and lithium in a composite oxide; and
a cathode additive composition represented by the following Chemical Formula 1:

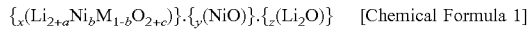    [Chemical Formula 1]

wherein, in Chemical Formula 1,
M is one or more metal atoms forming a divalent cation or a trivalent cation,
−0.2≤a≤0.2, 0.5≤b≤1.0, −0.2≤c≤0.2,
0.7≤x≤0.93, 0<y≤0.15, 0.07≤z≤0.15, and x+y+z=1.

2. The cathode mixture according to claim 1, wherein y=z.

3. The cathode mixture according to claim 1, wherein, for the cathode additive, a peak by lithium oxide ($Li_2O$) is detected in at least one of a range which 2θ is 30 to 35°, a range in which 2θ is 35 to 40°, or a range in which 2θ is 55 to 60°, by XRD (X-Ray Diffraction) measurement by Fe Kα X-ray (X-rα).

4. The cathode mixture according to claim 1, wherein the content of lithium oxide ($Li_2O$) in the total amount of the cathode additive (100 wt %) is greater than 7 wt % to 15 wt %.

5. The cathode mixture according to claim 1, wherein for the cathode additive, a peak by nickel oxide (NiO) is detected in at least one of a range in which 2θ is 35 to 40°, a range in which 2θ is 40 to 45°, or a range in which 2θ is 50 to 55°, by XRD (X-Ray Diffraction) measurement by Fe Kα X-ray (X-rα).

6. The cathode mixture according to claim 1, wherein the content of nickel oxide (NiO) in the total amount of the cathode additive (100 wt %) is greater than 0 wt % and equal to or less than 15 wt %.

7. The cathode mixture according to claim 1, wherein the cathode additive is included in the content of 1 to 30 wt %, based on the total weight of the mixture (100 wt %).

8. The cathode mixture according to claim 1, further comprising a conductive material, a binder, or a mixture thereof.

9. The cathode mixture according to claim 1, wherein 0.7≤x≤0.86, 0.07≤y≤0.15, 0.07≤z≤0.15, and x+y+z=1.

10. A lithium secondary battery comprising:
a cathode comprising the cathode mixture of claim 1;
an electrolyte; and
an anode.

11. The lithium secondary battery according to claim 10, wherein the anode includes one or more anode active materials selected from the group consisting of a carbon-based anode active material, a lithium metal, a lithium alloy, Si, $SiO_x$ (0<x<2), a Si—C composite, a Si-Q alloy (wherein Q is an alkali metal, an alkali earth metal, atoms of Groups 13 to 16, a transition metal, a rare earth atom, or a combination thereof, provided that it is not Si), Sn, $SnO_2$, a Sn—C composite, and a Sn-R (R is an alkali metal, an alkali earth metal, atoms of Groups 13 to 16, a transition metal, a rare earth metal, or a combination thereof, provided that it is not Sn).

* * * * *